April 28, 1925.
R. T. BIDDLE
1,535,894
SIDE ILLUMINATING DEVICE FOR VEHICLES
Filed Feb. 26, 1923
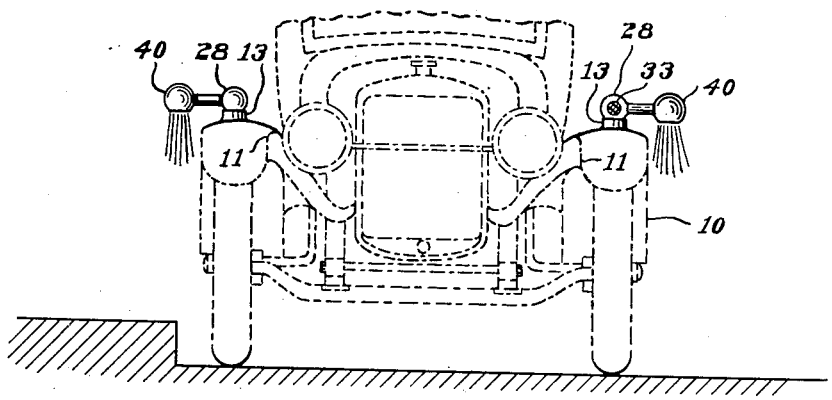
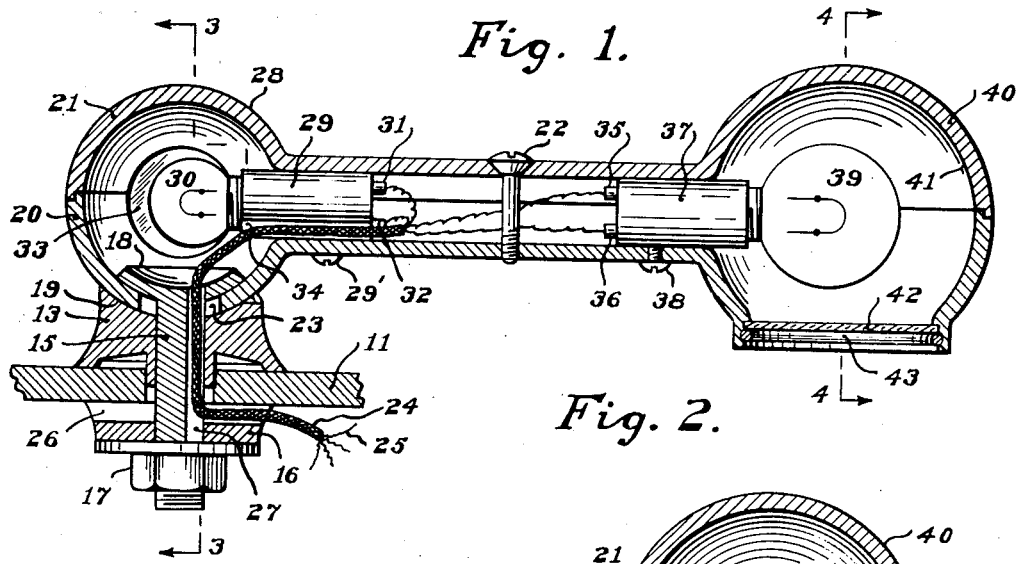
Fig. 1.
Fig. 2.
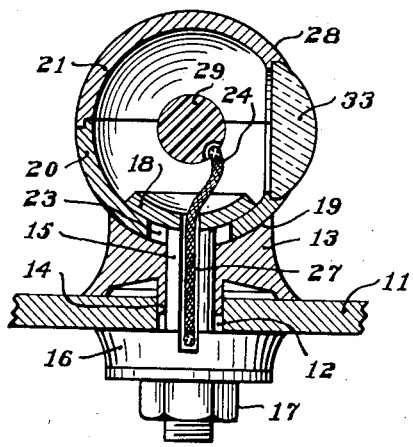
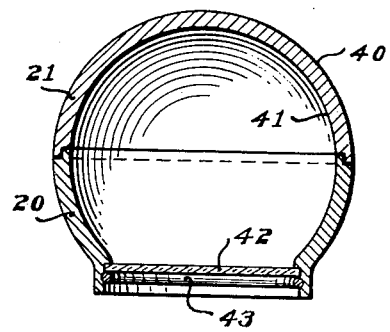
Fig. 4.
Fig. 3.
Reuben T. Biddle
INVENTOR
BY Victor J. Evans
ATTORNEY Patented Apr. 28, 1925.

1,535,894

UNITED STATES PATENT OFFICE.

REUBEN T. BIDDLE, OF PHILADELPHIA, PENNSYLVANIA.

SIDE-ILLUMINATING DEVICE FOR VEHICLES.

Application filed February 26, 1923. Serial No. 621,289.

*To all whom it may concern:*

Be it known that I, REUBEN T. BIDDLE, a citizen of the United States, residing at Philadelphia, in the county of Philadelphia and State of Pennsylvania, have invented new and useful Improvements in Side-Illuminating Devices for Vehicles, of which the following is a specification.

This invention relates to means for illuminating the side of a vehicle, and the road-bed adjacent the side of the vehicle for the purpose of indicating to the vehicles which may be approaching from the opposite direction, the position of the vehicle carrying the light.

Another object is to illuminate the road for the assistance of the person driving the vehicle which carries the light.

Another object is to produce a device of this nature which may be combined with a parking light or signal.

Another object is to produce a device of this nature which shall be simple of construction, consisting of few parts, cheaply and easily manufactured and assembled, and highly efficient for the purpose for which it is designed.

With these and other objects in view as will be more apparent, the invention consists in certain novel construction and combination and arrangement of parts, the essential features of which are hereinafter fully described, are particularly pointed out in the appended claims, and are illustrated in the accompanying drawing, in which:—

Figure 1—is a front elevation of a vehicle provided with a pair of my improved illuminating devices, one of which is provided with a parking light.

Figure 2—is a vertical longitudinal sectional view of one of the devices.

Figure 3—is a sectional view taken substantially along the line 3—3 of Figure 2.

Figure 4—is a sectional view taken substantially along the line 4—4 of Figure 2.

Like characters of reference refer to like parts in all the views.

Referring to the drawing in detail, 10 represents a vehicle and 11 the fenders thereof. The fender 11 is pierced with an aperture 12. A socket member 13 is seated on the upper side of the fender and is formed with a box 14 which extends into the aperture 12 so as to locate the parts in proper relationship.

A bolt 15 passes through the central aperture in member 13 and through the hole 12 and after passing through a washer 16 at the lower side of the fender, is secured in place by a nut 17. The upper end of the bolt 15 is formed into a concavo-convex head 18 which co-operates with a concave surface 19 of the member 13 so as to form what may be termed a ball and socket connection with the lamp member per se which will now be described.

The lamp casing consists of lower and upper castings 20 and 21, respectively, which are formed with a lap joint as indicated and are secured together by a screw or bolt 22. Generally speaking, the two elements 20 and 21 form a dumb-bell like casing which supports the road illuminating means and also the parking lamp.

The element 20 is formed with an aperture 23 through which the shank of bolt 15 passes. Aperture 23 being made of sufficient size to permit of the required movement of the member 20 on the support 13. A cable 24 comprising the necessary number of wires or leads 25 enters through a slot 26 in the washer 16 and passes up through a slot 27 in the bolt shank into the globular compartment 28. A socket 29 is seated in the constricted portion of members 20 and 21 and is secured to the member 20 by a screw 29' or any other desired means. In this socket is the parking lamp 30, and two of the leads 25 are connected with the terminals indicated at 31 and 32. Parking lenses 33 may be seated in the shell as indicated in Figures 2 and 3. It is of course understood that if the device is intended merely for road illuminating means, as is shown at the left in Figure 1, the socket 29 and lamp 30 and lenses 33 will be done away with and the globular compartment will be walled-in solidly where lenses 33 would otherwise be.

The cable 24 is shown to pass through a slot 34 along the side of the socket 29, and two of the leads 25 extend to terminals 35 and 36 of a socket 37 secured in place by a screw or the like 38, and carrying a lamp 39 in a second globular compartment indicated by the numeral 40. The casing at 41 which is over the lamp 39, is highly polished so as to act as a reflector, and below the lamp the element 20 is cut away so as to form an aperture to permit the light to be drawn downwardly on to the road at the side of the car and against the fender, front wheel and side of the vehicle. If desired, a glass 42 may be used as a closure for aperture 41 and may be held in place by the well-known spring-ring 43.

The leads 25 of the lamp 39 are preferably connected with the leads of the dimmer lights of the vehicle, so that when these lights are turned on upon approaching another vehicle, the lamps 39 will be simultaneously lighted so as to indicate to the driver of the approaching vehicle, where the side of the car is, so that he may more clearly judge how to direct his own machine thus avoiding accidents. The parking lamp 30 may be connected up with the switch of the tail-light so that when the tail-light is out, the current may be switched through the parking light 30.

It is of course understood that these are merely suggestions as to the method of connecting up the device, and that it is intended to cover a device of this nature when connected up in any desired manner.

While I have described what I deem to be the most desirable embodiment of my invention, it is obvious that many of the parts may be varied without in any way departing from the spirit of my invention, and I therefore do not limit myself to the exact details of construction herein shown nor to anything less than the whole of my invention limited only by the appended claims.

What I claim is:—

1. In a side illuminating device for vehicles, the combination of an attaching structure, a light carrying structure comprising a cylindrical tube, a substantially spherical shell on each end of said tube, means rotatably connecting one of said shells to said attaching structure, and illuminating means within said shell.

2. In a side illuminating device for vehicles, a cylindrical sleeve, substantially spherical shell on each end of said sleeve, means engaging one of said shells for rotatably connecting the shell to a vehicle, said last named shell provided with a rearwardly position lens, the shell on the end of the sleeve remote from said last named shell having a downwardly position transparent lens and illuminating means within said shell.

In testimony whereof I affix my signature.

REUBEN T. BIDDLE.